United States Patent [19]
Hirs

[11] 3,962,078
[45] June 8, 1976

[54] METHOD AND APPARATUS FOR TREATING LIQUID CONTAMINATED WITH RADIOACTIVE PARTICULATE SOLIDS

[75] Inventor: Gene Hirs, Birmingham, Mich.

[73] Assignee: Hydromation Filter Company, Livonia, Mich.

[22] Filed: Dec. 13, 1974

[21] Appl. No.: 532,418

[52] U.S. Cl.................................. 210/27; 210/28; 210/34; 210/35; 210/265; 210/275
[51] Int. Cl.².................. B01D 15/06; B01D 37/00
[58] Field of Search................ 210/27, 28, 34, 35, 210/68, 73, 77, 97, 138, 265, 275

[56] References Cited
UNITED STATES PATENTS

| | | | |
|---|---|---|---|
| 2,867,324 | 1/1959 | Hirs | 210/97 |
| 3,630,892 | 12/1971 | Hirs et al. | 210/73 X |
| 3,697,419 | 10/1972 | Grant | 210/27 |
| 3,773,177 | 11/1973 | Queiser et al. | 210/68 |

Primary Examiner—Charles N. Hart
Assistant Examiner—Robert H. Spitzer
Attorney, Agent, or Firm—Cullen, Settle, Sloman & Cantor

[57] ABSTRACT

A method and apparatus reduces the amount of radioactive solids resulting from the filtration of particulate contaminants from liquid in a nuclear reactor plant. A filtration system includes a pre-filter comprising a sheet filter medium through which the reactor liquid passes to remove relatively large particulate contaminants for storage or disposal. The reactor liquid is then passed through a bed of granular filter medium to accumulate substantially all the previously non-filtered contaminants and thereby provide a clarified liquid suitable for reuse in the reactor. Backwash liquid is flowed through the granular filter bed to remove and entrain the accumulated contaminants into a slurry which is received by a reservoir where the slurry is maintained quiescently to settle the contaminants. Removal of liquid from the reservoir concentrates the contaminants for storage or further processing, without the necessity of large quantities of filter aids that would increase the quantity of storage-requiring contaminated solids.

16 Claims, 3 Drawing Figures

METHOD AND APPARATUS FOR TREATING LIQUID CONTAMINATED WITH RADIOACTIVE PARTICULATE SOLIDS

BACKGROUND OF THE INVENTION

1. Field of the Invention

The present invention relates generally to a method and apparatus for removing particulate contaminants from liquid in a radioactive environment and more particularly to concentrating the filtered radioactive suspended solids for storage. The method and apparatus contemplate flowing nuclear reactor liquid contaminated with low conductivity radioactive waste first through a fine mesh pre-filter for removal of the larger contaminants and then through a deep-bed filter for removal of the very fine particulates.

2. The Prior Art

Filtration of particulate contaminants from liquid used in nuclear power plants, such as pressure water reactors or boiling water reactors, has posed numerous problems in the prior art. Quite naturally, some of these problems are a direct result of the radioactive nature of the liquid and particulate contaminants. Another reason for the prior art problems results from the wide range in size of the particulate contaminant which can appear within the circulating liquid in the nuclear power plant. For example, the contaminanats range in size from very fine iron oxides and oxide products that are virtually non-filterable to resin beads used in ion exchange filters. Between these two extremes, other particulate contaminants such as lint, floor and laundry wastes, powdered resin used in ion exchange filters, and filter aid materials such as diatomaceous earth or fiber cellulose filter media may also be found in the circulating liquid of the nuclear power plant.

Various attempts have been made in the prior art to effectively remove the various-sized particulate contaminants, but these prior art attempts have exhibited shortcomings in their inability to remove the very fine contaminants or in their high cost of manufacture and operation.

One such approach in the prior art was to separate all the different types of waste into separate containers for separate filtration and removal of each type contaminants. This approach has proved unsatisfactory in some cases due to the inability to properly remove the contaminants to an acceptable level and in substantially all cases due to the cost involved in providing separate filtration assemblies for each type of contaminant.

Another prior art approach has been to use large clarifiers to settle the heavier suspended contaminant solids and then filter the supernate through pre-coat and body feed filters. This particular approach has proved to be unsatisfactory because it is necessary to use pre-coat material such as diatomaceous earth or cellulose fiber that becomes radioactively contaminated and requires storing. An additional disadvantage of this particular type of prior art approach is the necessity in adding body feed to the accumulated contaminants to maintain sufficient porosity so that filtration can continue for a reasonable period of time. The body feed material added to such a unit also becomes radioactively contaminated and likewise requires storing. It has turned out in many cases with this type of filtration that there is up to ten times as much filter-aid material required as there is original radioactive contaminants. Thus, the amount of contaminated solids that require storing are multiplied ten times with this type filter arrangement.

An example of a prior art filtration process employing both the two previously described filtration assemblies with the inherent shortcomings is disclosed in U.S. Pat. No. 3,773,177.

Centrifugation is a third example of a prior art attempt to remove particulate contaminants from liquid in a nuclear power plant. The primary problem with this type of separator is the inability to remove the very fine particulate contaminants and contaminants having a very light specific gravity. Another problem is considerable wear on the centrifuge due to the gritty materials present in the reactor liquids.

The present invention overcomes these prior art problems of concentrating the contaminants to a small, easily storable volume since it is not necessary to add large dosages of filtering aid materials. More importantly, the present invention achieves a clarified effluent capable of meeting standards of almost any nuclear power plant in the world, so that the clarified liquid may be recirculated for further use.

Definition and Explanation of Terms

For purposes of simplifying designations of filter media sizes, all references herein to a particular "mesh" or "mesh size" refer to standard U.S. Sieve Series (also known as U.S. Standard Mesh Sieve size). A designation of a mesh size preceded by a minus (−) sign indicates that all granules will pass that size sieve; or on the average are finer than the sieve size when determining an average size of filter medium. A designation of mesh size preceded by a plus(+) sign indicates that all granules will be retained on that size sieve; or on the average are coarser than that sieve size when determining an average size of filter medium. For example, a layer or bed of granular filter media designated as −8 to +30 mesh or between −8 and 30 mesh means all the granules will pass a No. 8 U.S. Sieve Series mesh and all the granules will be retained on a No. 30 U.S. Sieve Series mesh. Stated another way, all the granules are smaller than a No. 8 sieve and larger than a No. 30 sieve. A medium designated as having an average size of between −8 and +30 mesh means that the average sized filter granule in the medium will pass a No. 8 U.S. Sieve Series mesh and be retained on a No. 30 U.S. Sieve Series mesh.

"Average size" of filter medium is defined as a mathematically derived figure equal to the sum of the individual products of the fraction by weight of each mesh size in a layer of medium multiplied by the respective mesh sizes. For example, in a filter bed consisting of a layer of granulated black walnut shells, having 40% by weight of 6 mesh granules and 60% by weight of 8 mesh granules, and a layer of silica sand, having 50% by weight of 20 mesh and 50% by weight of 30 mesh, the "average size" of filter medium in the respective layers is 7.2 mesh (0.40 × mesh + 0.60 × 8 mesh = 7.2 mesh) and 25.0 mesh (0.50 × 20 mesh + 0.50 × 30 mesh = 25.0 mesh).

SUMMARY OF THE INVENTION

With the increasing demand for nuclear power, it is becoming more important to develop systems to rejuvenate the liquid utilized in a nuclear power plant and to reduce the amount of contaminated solids from such plants that require storage for radioactive decontamination. The present invention proposes both a method and apparatus which is particularly useful in a boiling water reactor, and which may likewise be utilized effectively in other types of nuclear plants, such as pressure water plants.

The filtration apparatus includes a system for removing radioactively contaminated particulate solids from a low conductive liquid in a nuclear reactor plant. The system includes a first filter including a sheet medium having flow openings between about 0.002 and 0.025 inch in size through which a liquid contaminated with radioactive particulate solids is flowed to remove a portion of the particulates. A second filter is interconnected with the first filter by a flow conduit, the second filter including a bed of granular filter medium for accumulating and coalescing substantially all the radioactive particulate contaminants which were passed through the first filter. The effluent from the second filter is a clarified liquid having a reduced contaminant content and being suitable for reuse in the nuclear power plant. Backwash means are provided to flow liquid through the granular filter bed in a direction reverse to normal filtration flow to expand the bed and remove substantially all the accumulated, coalesced particulate contaminants. A reservoir receives the backwash liquid with the removed contaminants and retains the backwash liquid in a quiescent pool to settle the coalesced particulates. After a period of quiescence, means withdraws liquid from the pool to concentrate the radioactive particulates.

In a preferred embodiment, the sheet filter medium has flow openings less than 0.010 inch in size, and in a more preferred embodiment the openings are less than 0.005 inch in size. The sheet medium may be comprised of a fabric such as polypropylene, nylon, or felt, or a paper medium such as cellulose fiber.

The first filter may also include a conveyor system having a plurality of flights movable over the surface of the sheet filter medium for removing certain contaminants such as resin filter beads which may become entrained in the reactor liquid flow. Further, the first filter may also include a means for removing contaminants from the sheet filter medium surface, and an preferred embodiment includes a chain link conveyor to which the filter medium is interconnected, the chain link conveyor being indexable to position the sheet filter medium for ejecting the accumularte contaminants.

In a preferred embodiment, the second filter includes two vertically arranged layers of granular material including an upper layer of coarse material superimposed on a lower layer of fine material, with an interface between the layers consisting of the materials from the upper and lower layers. In the most preferred embodiment, the upper layer is comprised of granulated black walnut shells having a specific gravity of about 1.3 and an average size of between about −8 and +12 mesh, whereas the lower layer comprises anthracite having a specific gravity of about 1.6 and an average size of between about −12 and +30 mesh. It is desireable that both materials comprising the bed of granular filter medium have a specific gravity of less than about 1.6 so that they can be flushed from the second filter in the event of radioactive contamination. For example, if sand were used as a filter medium in the second filter, removal of this material would require some type of manual operation, which is undesirable in a radioactive environment.

The method of the present invention includes flowing a liquid contaminated with radioactive particulate solids from a nuclear reactor through a sheet filter medium having mesh openings in the range of from about 0.002 to 0.025 inches. During this flowing operation particulate contaminants larger than the mesh openings are accumulated in a filter cake on the sheet filter medium. Also, some of the contaminants smaller than the mesh openings will probably be entrapped in the accumulated filter cake. Thus, some portion of the non-accumulated contaminants smaller than the mesh openings are passed through the sheet filter in a partially clarified liquid flow. This liquid flow is directed through a bed of granular filter medium where substantially all the previously non-filtered contaminants are accumulated to achieve a clarified liquid suitable for reuse in the nuclear reactor. Flow through the sheet filter medium is terminated after the accumulation of a filter cake which is removed for disposal. Flow is also terminated through the granular filter bed, whereupon a backwash liquid flows through the bed in a direction reverse to normal filtration flow to expand the bed and remove substantially all the accumulated particulate contaminants. The backwash liquid with removed contaminants is received and retained in a reservoir as a quiescent pool to settle the contaminants. Liquid is thereafter removed from the reservoir, for example by decanting in order to concentrate the contaminants.

In one preferred embodiment of the method, the invention includes coalescing the contaminants as they are accumulated in the bed of granular filter medium so that the contaminants will be more prone to settle in the quiescent pool. The method also contemplates the addition of a coagulating agent, such as polyelectrolyte, to the backwash liquid and accumulated contaminants to also enhance settling of contaminants in the reservoir.

Thus, the present invention overcomes the problems previously discussed in connection with the prior art devices and methods and provides the advantages of: (1) effectively removing particulate contaminants from liquid in a nuclear reactor so that the liquid may be reused; and (2) drastically reducing the quantity of radioactive particulate contaminants generated during the filtration process.

DETAILED DESCRIPTION OF THE INVENTION

Figure 1:
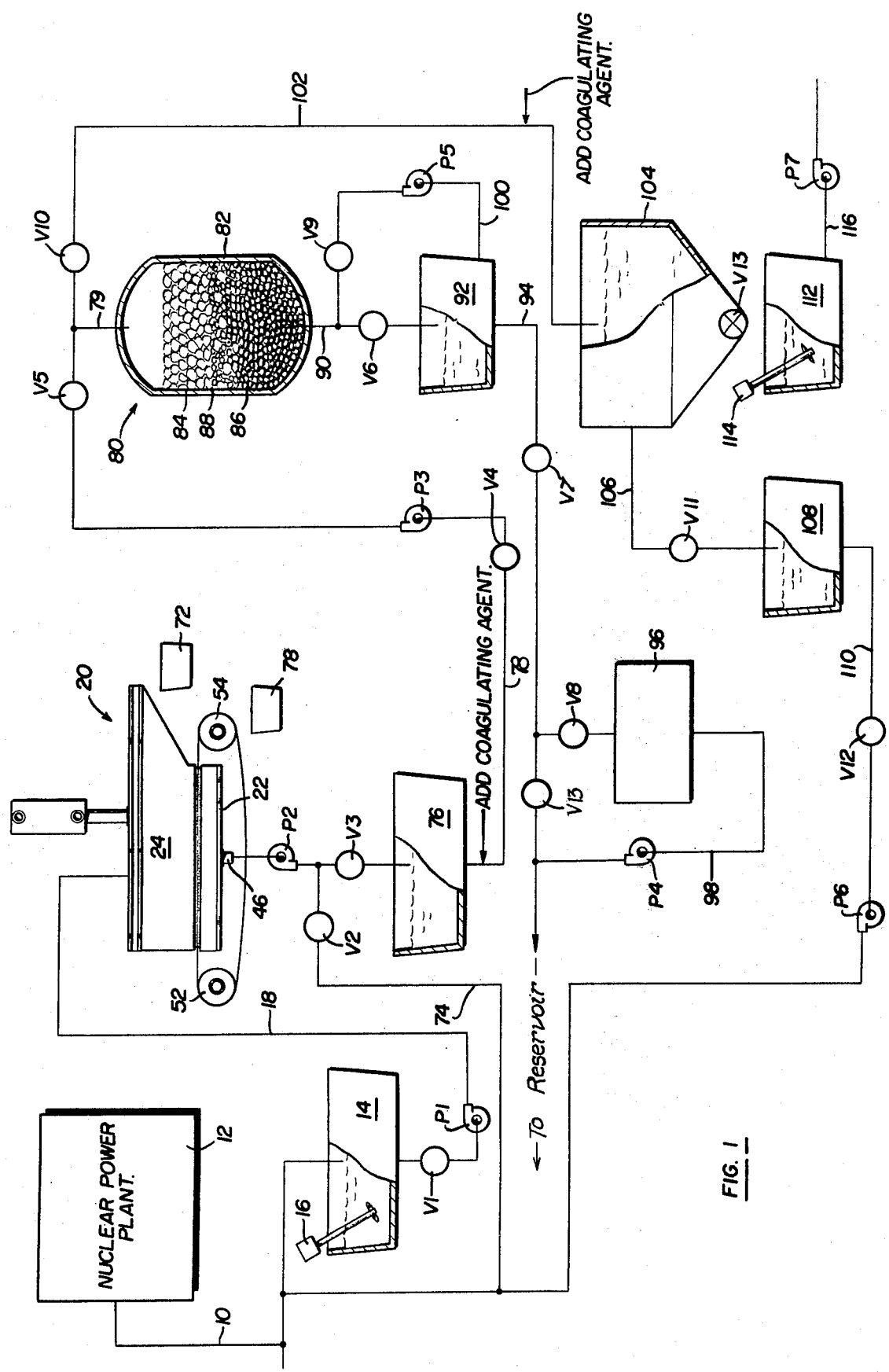
FIG. 1 is a somewhat schematic overall view of the filtration system proposed by the present invention.

The present invention relates to a method and apparatus for filtering the wide variety of particulate contaminants which may appear in low conductivity nuclear reactor liquid. For example, the contaminant appearing in nuclear reactor liquid may include such items as various iron oxides, oxidation products, resin beads used in ionic exchange filters, various types of pre-coat materials and filter aids such as diatomaceous earth or fibrous cellulose filter media, and additionally floor or laundry waste such as lint. Moreover, this invention filters those contaminants without adding large quantities of body feed or filter aid materials which would add to the total solid waste becoming radioactively contaminated and requiring storage for decontamination.

As illustrated in the drawings, a flow line 10 delivers liquid (aqueousbased in most instances) from the nuclear reactor power plant 12 to an optional holding tank or reservoir 14 which may include an optional agitator 16 to maintain the particulate contaminant in a slurry. The slurry (or mixture) is pumped from vessel 14 by pump P1 through opened valve V1 and flow line 18 to a first filter 20 for removal of the relatively large particulate contaminants. For details of certain features of filter 20, reference is made to U.S. Pat. Nos. 2,867,324, 2,867,325, and 2,867,326, which are incorporated by reference.

Figures 2, 3:
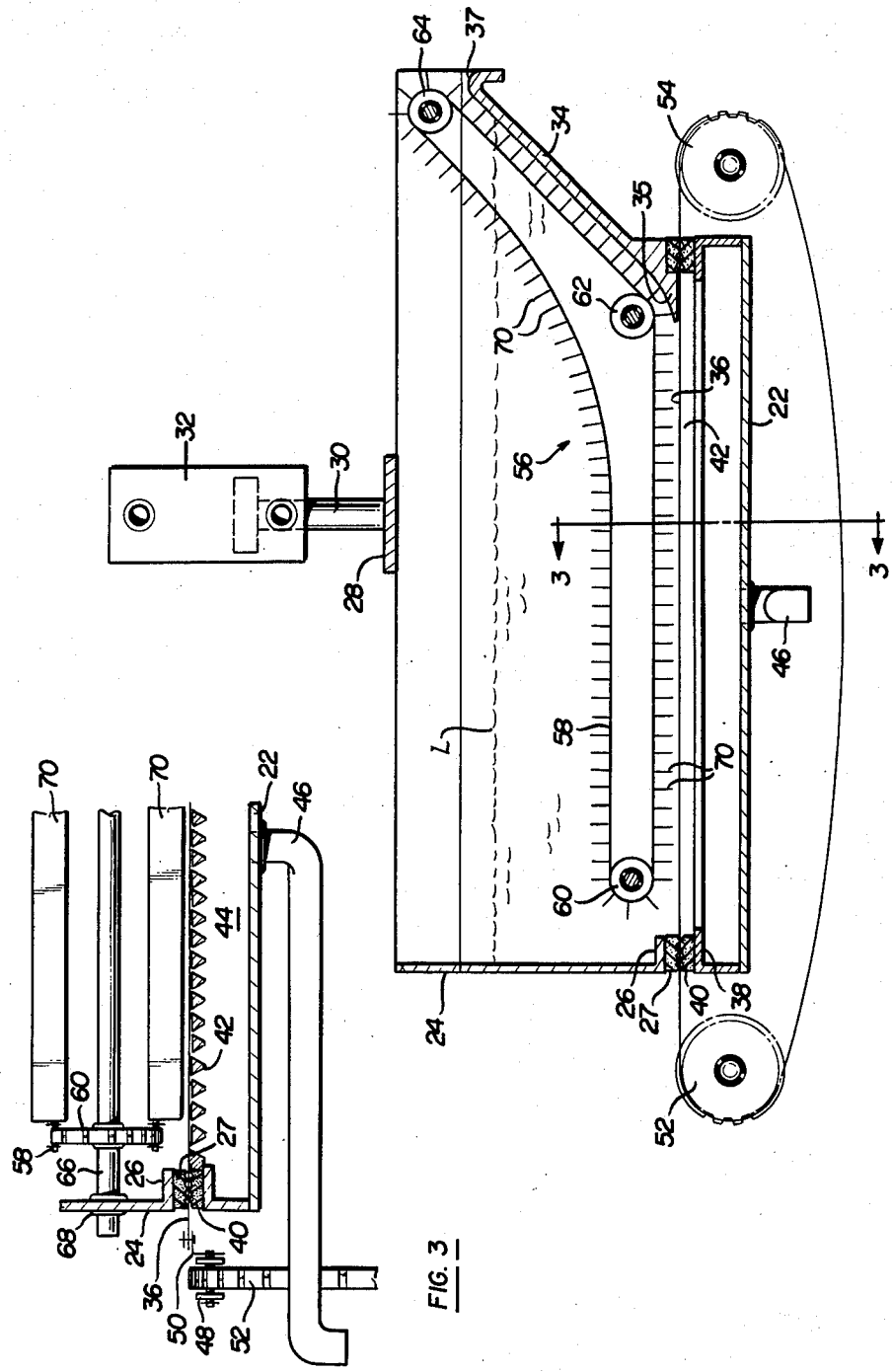
FIG. 2 is a detailed view of the pre-filter contemplated for use in the present invention.
FIG. 3 is a detailed sectional view of the pre-filter taken along line 3—3 of FIG. 2.

Other details of the pre-filter are shown in FIGS. 2 and 3, wherein filter 20 is illustrated as including a fixed lower shell 22 and a vertically movable upper shell 24. The upper shell includes sidewalls defining an opened-topped receptacle to receive contaminated liquid from flow line 19, lower inwardly turned flanges 26 to which seals 27 are suitable secured in a conventional manner, and an upper transverse beam 28 extending across laterally opposed sidewalls of the shell. A piston 30 of hydraulic ram 32 is rigidly connected to the transverse beam 28 for raising or lowering the upper shell as desired. The upper shell further includes an inclined endwall 34 having a lower portion 35 converging with a sheet-type filter medium secured in position between the upper and lower shells 24 and 22, respectively, as will be more fully discussed below. The inclined ramp 34 terminates at its upper end in a lip 37 to allow contaminants to be expelled from the first filter, as will also be more fully discussed below. The lower shell also includes inwardly turned flanges 38 to which seals 40 are likewise suitable secured in a conventional manner. The seals may be formed in any shape or be comprised of any material suitable for providing a liquid-tight seal between the upper and lower shells when positioned as illustrated FIGS. 2 and 3.

The pre-filter 20 also includes a grating 42, which in preferred embodiment includes wedge wire, to support the filter medium 36. A flow chamber is defined beneath the grating 42 through which the liquid flows after passing through the filter medium 36 in route to flow line 46.

The sheet filter medium 36 may include any foraminous medium such as wedge wire, a paper septum such as cellulose, or a fabric septum such as nylon, polypropylene or felt; and should preferable be a reusable septum to avoid the requirement of disposal after having come in contact with radioactively contaminated particulates. Since the sheet filter 36 is a pre-filter, the specific mesh opening should be chosen to selectively remove particulate contaminants to achieve a partially clarified liquid which can then be further clarified to the point of being reusable after further treatment by a subsequent filtration device. In a desired embodiment, the septum includes flow openings or mesh openings in a size range of from about 0.002 to 0.025 inch. A more preferred size range is from about 0.002 to 0.010, and the most preferred size range is from about 0.002 to 0.005 inches so that the partially clarified liquid will have a particulate contaminant content of approximately 10 parts per million based upon average contaminant content in nuclear power reactor plants. Thus, the pre-filter will accumulate such contaminants as diatomaceous earth, cellular filter aids, lint and other large particles.

The sheet filter 36 in preferred embodiment is releaseably secured to a sprocket chain 48 by a clip 50, which may be constructed in accordance with the teachings of U.S. Pat. No. 3,807,559, incorporated by reference. The sprocket chain is arranged in a loop to engage an idler roller sprocket 54 and a driving sprocket 52 which may be rotationally driven by appropriate power means such as an electric motor (not shown).

The pre-filter also includes a flight conveyor 56 for removing certain particulates. Specifically, resin filter beads from ion exchangers sometime become entrained in the liquid flow within the nuclear power plant. For the most part, these filter beads must be disposed of separately or treated separately by chemical regeneration with caustic or acidic materials and therefore must be separated from the other contaminants accumulating in the filter cake within the pre-filter 20. Thus, the flight conveyor 56 includes a pair of laterally opposed chains 58 (only one being shown in FIG. 3), which engage a driveable sprocket gear 60 and idler sprockets 62 and 64 supported on shafts which extend through the opposed lateral sidewalls of the upper shell. Each of the driveable sprocket gears 60 includes a shaft 66 which extends through a rotational bearing 68 in the opposed lateral sidewall, and may be connected with a suitable rotational drive means (not shown) such as an electrical motor. The bearings may include gaskets to prevent leakage of liquid from the pre-filter 20. A plurality of conveyor flights 70 are suitable attached to links in the chain 58 and are positioned near the sheet filter 36 during movement between sprockets 60 and 62 to convey filter beads or similar contaminants onto the convergent edge 35. Flight movement between sprockets 62 and 64 convey the beads up ramp 34, over the lip 37 and into an accumulation hopper 72 for further treatment or disposal. It must be noted that the individual conveyor flights 70 do not come in contact with the filter septum 36 but are slightly spaced therefrom in order to accumulate only the larger particulate contaminants desired to be removed separately.

To operation of that portion of the filter system described to this point includes flowing the contaminated liquid from the nuclear power plant through flow line 10 into a storing vessel 14. From there, the contaminated liquid is pumped by pump P1 through opened valve V1 and flow line 18 into the upper shell 24 of the pre-filter 20. As illustrated in FIG. 2, the contaminated liquid level in filter 20 is illustrated for exemplary purposes by L. An optional pump P2 in flow line 46 then draws the contaminated liquid through the filter medium 36, forming a filter cake of accumulated particulate contaminants. The filter cake will include particulates larger than the mesh or flow openings in sheet filter 36 and probably some particulates smaller than the mesh openings by entrapment in the filter cake.

A flow line 74 with a normally closed valve V2 is provided so that flow from the pre-filter may be directed back to the holding vessel 14 as desired or as needed, for example during flow start-up through the pre-filter. Normally, however, the partially clarified liquid pumped from the pre-filter by pump P2 will be directed through an opened valve V3 into an optional reservoir or holding tank 76. In the event that extremely large particulate contaminants such as resin filter beads from an ion exchanger become accumulated on the filter septum 36, it may be desirable to activate the flight conveyor system to convey the beads up ramp 34 and out of the pre-filter as described previously.

After a pre-set period of time, or after a depth of filter cake has been accumulated on the septum 36, as evidenced by a rise in the liquid level in the upper shell 24 or by a change in pressure in line 46, it will be necessary to energize the chain link conveyor system 48 after raising the upper shell 24 by piston rod 30. Movement of the chain link conveyor system will index the filter septum 35 and dump the previously accumulated filter cake into a hopper 78. Thus, the chain link conveyor system for the filter constitutes a means for removing the accumulated contaminants from the medium surface. Of course, other similar means could be used to remove the accumulated contaminants. The contaminant mass dumped into the hopper 78 will comprise approximately 30–50% or more of particulate solids and will be ready for immediate storage. Alternatively, this dumped contaminant mass may be further processed, for example by centrifugation in order to further concentrate the particulates prior to storage.

When it is desirable to re-establish contaminated liquid flow into the pre-filter, the piston rod 30 will be lowered within the hydraulic ramp 32, thereby lowering the upper shell 24 and establishing a liquid-tight seal by engagement of seals 27 and 40 between the upper and lower shells.

As described previously, effluent or partially clarified liquid from the pre-filter will be pumped by pump P2 through flow line 46 into an optional holding tank 76, from which the liquid may be pumped by pump P3 through opened valve V4 and V5, flow line 78, and flow line section 79 through deep-bed polishing filter 80. Polishing filter 80 includes a vessel 82 housing a granular filter medium which must be selected to achieve a very low contaminant content to meet applicable standards. For example, the effluent from the polishing filter may be under a federal regulation requirement that the contaminant content be less than 1 part per million. Contaminants are accumulated in the polishing filter by entrapment within the interstices between the filter granules.

In the most preferred embodiment, the granular filter bed of polishing filter 80 includes a bottom layer 86 of anthracite having a specific gravity of about 1.6 and an average mesh size of between about −12 and +30 mesh. An upper layer 84 is superimposed on the lower layer 86 and includes granulated black walnut shells having a specific gravity of about 1.3 and an average granule size of between about −8 and +12 mesh. The upper and bottom layers are intermixed to form an interface 88 to provide a granual reduction in filter granule size so that the particulate contaminants may penetrate the bottom granule layer. According to the most preferred teachings of the present invention, the granule medium in the polishing filter 80 is limited to a specific gravity of approximately 1.6, regardless of the particulate medium being employed, so that the material may be flushed or backwashed from the vessel in the event of radioactive contamination.

The effluent from polishing filter 80, preferably having a contaminant content of only about one part per million and more preferably of only about 0.5 parts per million, flows through line 90 and opened valve V6 into an optional holding tank 92. From there, the clarified liquid effluent may flow through line 94 and opened valves V7 and V13 to a reservoir, prior to recirculation back to the nuclear power plant. (For example where testing may be conducted for contaminant content.) Alernately, the clarified liquid may be conducted into a demineralizer 96 (by closing valve V13) through an opened valve V8 and then pumped through line 98 by pump P4 to the reactor. The demineralizer 96 is of conventional construction and well known to those in the art, and therefore is not believed to require detailed description.

It has been determined that the accumulated particles within the polishing filter 80 tend to coalesce to form particles 3 or 4 times larger than the particles appearing in the partially clarified liquid flow through flow line 79. Thus, after the accumulated particulate contaminants are removed in a backwash liquid from the polishing filter 80, it will become easier to separate the contaminants from the liquid by settling.

A backwash cycle is initiated after a preselected time period or after a preselected pressure differential has been developed as follows: valves V9 and V10 are opened, valves V5 and V6 are closed, pump P3 is de-energized and pump P5 is energized to pump liquid from the holding tank 92 through flow line 100 into polishing filter 80 in a direction reverse to normal filtration flow. The backwash flow rate is chosen to expand the filter bed layers so that the accumulated contaminants can be removed. In preferred embodiment, this flow rate will be approximately 12 to 20 gallons per minute per square foot of cross sectional area. After substantially all the contaminants have been removed from the filter material, backwash flow is terminated. Layers 84 and 86 with interface 88 will be reformed by settling into position as shown in FIG. 1.

Flow line 90 may optionally include conventional headers (not shown) in the lower portion of vessel 80. These headers or similar components will distribute the backwash liquid over the cross-section of the granular filter medium to prevent pockets or channels from being formed in the granular medium during backwash. These headers are not illustrated for purposes of simplicity, since they may be of conventional design as known in the art.

The backwash liquid with the removed, coalesced particulates flows out of polishing filter 80 through flow line 79 and 102 where additional slight dosages of a coagulating agent may be added to further increase the particulate size. The backwash liquid flows from line 102 into a backwash concentrator tank 104 where the flow is received and retained in a quiescent pool for some period of time to allow settling of the coagulating, coalesced particles. The specific period of time may depend upon the particular contaminants being removed by the polishing filter but will generally require at least about 30 minutes. Additional coalescing should occur within the backwash concentrator tank even without the addition of a coagulating agent into flow line 102 as a result of the contaminants settling toward the bottom of the tank.

After a sufficient period of quescence, liquid may be removed from the backwash concentrator tank, for example by decanting, through line 106 and opened valve V11 into an optional holding tank 108, from which the liquid may then be pumped by pump P6 through line 110 and opened valve V12 back to the original holding tank or reservoir 14 for further processing.

It has been determined that a majority of the liquid in the concentration tank 104 can be separated from the particulate contaminant mixture after the period of quiescence. After liquid removal, the contaminant concentration in the liquid left in the tank is from about 10,000 to 15,000 parts per million. This highly concentrated sludge is removed from the concentrator tank 104 by opening a suitable valve V13, for example of the butterfly or keystone type, whereupon the sludge flows into an optional holding tank 112. An optional agitator 144 is provided in the tank to maintain the contaminants in a slurry, which can be pumped through line 116 by pump P7 for further processing or dewatering, for example by flash dryers, evaporators, or centrifuges. Thus, according to the present invention, of approximately every 1,000 to 1,500 gallons of liquid that comes into the filtration system, only 1 gallon has to be further processed by the dewatering equipment beyond the holding tank 112 to concentrate the solids for storage. As previously mentioned, the concentration of the contaminants after settling and decanting would be approximately 10,000 to 15,000 parts per million (or one to one and a half percent solids). The further dewatering by centrifugation or evaporation, would further concentrate the solids up to about 25 to 40%. Therefore, the overall concentration of the particulate contaminants in the liquid flowing from the pre-filter would be from approximately 10 parts per million to 400,000 parts per million or in otherwords a concentration of 40,000 times. More important, the present invention achieves this concentration without the additional of large amounts of filtering aids which add to the total volume of radioactively contaminated particles requiring storage.

As previously pointed out, the present invention is particularly adapted for use with low conductivity radioactive waste in liquid of a nuclear reactor plant. Thus, liquids including ion exchange regeneration chemicals which are acidic or caustic must be kept outside the present filtering system. The amount of liquid in a nuclear reactor plant of the low conductivity type is by far the majority of the total plant liquid, thus lending itself to the very important advantage afforded by the present invention.

All valves and pumps used in this invention may be of conventional design; therefore, a detailed description of each of these elements is considered unnecessary.

Having fully and completely described my invention, I now claim:

1. In a method of removing radioactive particulate contaminants from liquid in a nuclear reactor plant for storage and disposal, the steps of:

flowing a liquid contaminated with radioactive particulate solids from a nuclear reactor through a foraminous medium having openings in the range of from about 0.002 to 0.025 inch accumulating particulate contaminants as a filter cake on the foraminous medium, and passing any non-accumulated particulate contaminants in a partially clarified liquid flow;

flowing the partially clarified liquid through a bed of granular filter medium and accumulating substantially all the previously non-filtered contaminants to provide a clarified liquid suitable for reuse, the filter bed being comprised of granular material having a specific gravity less than about 1.6;

terminating flow through the foraminous medium after that medium has accumulated a filter cake of radioactive particulate contaminants and removing the accumulated, radioactive filter cake for disposal;

terminating flow through the granular filter bed, flowing backwash liquid through the bed in a direction reverse to normal filtration flow, expanding the bed and removing at least a portion of the accumulated particulate contaminants from the granular filter bed;

accumulating the backwash liquid and removed contaminants from the granular filter bed in a reservoir, quiescently maintaining the accumulated backwash liquid and contaminants, and settling at least a part of the contaminants; and decanting liquid from the reservoir to concentrate the contaminants.

2. The method as defined in claim 1, further including the step of adding a coagulating agent to the backwash liquid and accumulated contaminants to enhance the settling of contaminants in the reservoir.

3. The method as defined in claim 1, further including the step of demineralizing the clarified liquid flow prior to re-use thereof in the nuclear rector plant.

4. The method as defined in claim 3, further including the step of de-watering the concentrated contaminants for storage.

5. The method as defined in claim 1, characterized by adding only a coagulating agent in an amount of approximately 0.25 parts per million to the partially clarified liquid prior to flow through the bed of granular filter medium.

6. In a method of reducing the quantity of radioactively contaminated particulate solids generated during the filtration of liquid in a nuclear power plant, the steps of:

flowing an essentially aqueous-based liquid contaminated with radioactive particulate solids from a nuclear ractor thorugh a foraminous filter medium and removing substantially all of the particulate contaminants larger than about 0.005 inch in size to provide a partially clarified liquid;

flowing the partially clarified liquid through a bed of granular filter medium comprised of a top layer of granulated black walnut shells having a specific gravity of about 1.3 and an average size between about −8 and +12 mesh, the top layer being superimposed on a bottom layer of anthracite having a specific gravity of about 1.6 and an average size between about −12 and +30 mesh, and an interface region between the two layers comprised of an admixture of walnut shells and anthracite, and removing substantially all the previously non-filtered contaminants to provide a clarified liquid suitable for re-use and having a particulate content of only about one part per million;

terminating flow through the foraminous filter medium after that medium has accumulated a filter cake of radioactive particulate contaminants and removing the accumulated, radioactive filter cake for storage;

terminating flow through the granular filter bed and flowing backwash liquid through the bed in a direction reverse to normal filtration flow at a rate of from about 12 to 20 gallons per minute per square foot of cross-sectional filter bed area to expand the bed, thereby removing substantially all the accumulated particulate contaminants from the granular filter bed;

maintaining the backwash liquid and removed contaminants in a quiescent reservoir for approximately 30 minutes, and coagulating the removed contaminants; and removing a portion of the liquid from the reservoir only after the period of quiescence, leaving the coagulated contaminants for dewatering an storage.

7. In a method of filtering water in a nuclear power plant containing particulate contaminants, the steps of:
   successively filtering the water through (a) a foraminous filter medium having openings therethrough in the range of between about 0.002 inch and 0.025 inch and (b) a deep bed filter comprised of granular filter media;
   accumulating particulate contaminants as a filter cake on the foraminous filter medium and subsequently removing the accumulated contaminants from the foraminous medium; accumulating in the deep bed filter substantially all the remaining particulate contamints in the water passed through the foraminuous filter, and recirculating the water from the deep bed filter back to a reactor for reuse;
   backwashing the deep bed filter and removing substantially all of the accumulated particulate contaminants therein;
   receiving and retaining the backwash liquid with removed contaminants in a quiescent pool and settling the contaminants; decanting liquid from the quiescent pool after settling of the particulates and recirculating the decanted liquid back to the foraminous filter medium for further processing; and
   removing the settled particulates from the quiescent pool after decanting as a concentrated contaminated waste.

8. In a method of removing radioactive particulate contaminants from a liquid in a nuclear reactor plant for storage and disposal, the steps of:
   flowing a liquid contaminated with radioactive particulate solids from a nuclear reactor through a foraminous medium having openings in the range of from about 0.002 to 0.025 inch, accumulating particulate contaminants as a filter cake on the foraminous medium, and passing any non-accumulated particulate contaminants in a partially clarified liquid flow;
   flowing the partially clarified liquid through a bed of granular filter medium and accumulating substantially all the previously-non-filtered contaminants to provide a clarified liquid suitable for reuse;
   terminating flow through the foraminous medium after that medium has accumulated a filter cake of radioactive particulate contaminants and removing the accumulated, radioactive filter cake for disposal;
   backwashing the deep bed filter and removing at least a portion of the accumulated particulate contaminants therein;
   accumulating the backwash liquid and removed contaminants from the granular filter bed in a reservoir, quiescently maintaining the accumulated backwash liquid and contaminants, and settling at least a part of the contaminants; and
   decanting liquid from the reservoir to concentrate the contaminants.

9. In a filtration system for removing radioactive particulate contaminants from liquid in a nuclear reactor plant for storage, comprising: means flowing liquid contaminated with radioactive particulate solids from a nuclear reactor through a pre-filter for removal of the relatively large radioactive contaminants to provide a partially clarified liquid; the pre-filter including (a) a sheet filter medium having mesh openings between about 0.002 and 0.025 inches in size, (b) means adjacent the filter medium surface for conveying resin filter beads and similar materials from the medium surface, and (c) means for removing substantially all the other accumulated contaminants from the medium surface for storage; a conduit interconnecting the pre-filter with a filter bed of granular filter medium for flowing the partially clarified liquid through the granular filter bed to remove substantially all the non-filtered radioactive particulates which were passed through the pre-filter, to provide a clarified, liquid suitable for re-use, the granular filter bed including a top layer of granulated black walnut shells having a specific gravity of approximately 1.3 and an average size of between about −8 and +12 mesh, the top layer being superimposed on a bottom layer of anthracite having a specific gravity of about 1.6 and an average size of between about −12 and +30 mesh, and an interface region between the top and bottom layers comprised of an admixture of walnut shells and anthracite; means for flowing backwash liquid through the granular filter bed in a direction reverse to normal filtration flow at a rate of from about 12 to 20 gallons per minute per square foot of cross-sectional filter bed area to expand the bed and remove substantially all the accumulated particulate contaminants therefrom; reservoir means retaining the backwash liquid with removed contaminants in a quiescent pool for settling the contaminants; and means for withdrawing liquid from the quiescent pool for concentrating the radioactive particulate contaminants.

10. The apparatus as defined in claim 9, wherein the means for removing contaminants from the sheet filter medium includes a link conveyor to which the sheet filter is interconnected, the link conveyor being indexable to position the sheet filter for ejection of the accumulated contaminants.

11. A filtration system for removing radioactively contaminated particulate solids from liquid in a nuclear reactor plant, comprising: means for flowing liquid contaminated with radioactive particulate solids from a nuclear ractor through a first filter including a reusable foraminous medium having flow openings between about 0.002 and 0.025 inch in size, the foraminous medium accumulating radioactive contaminants thereon and passing any non-accumulated contaminants in a partially clarified liquid flow; a flow conduit interconnecting the first filter with a second filter including a bed of granular filter medium for accumulating and coalescing substantially all the radioactive particulate contaminants passed through the first filter including a bed of granular filter medium for a clarified liquid suitable for re-use in the nuclear power plant; means for removing the accumulated radioactive contaminants from the foraminous medium; means for flowing backwash liquid through the granular filter bed in a direction reverse to normal filtration flow to expand the bed and remove substantially all the accumulated, coalesced particulate radioactive contaminants therefrom; a reservoir means (a) receiving the backwash liquid with removed radioactive contaminants and (b) retaining same in a quiescent pool to settle the radioactive particulates; means for decanting liquid from the quiescent pool after settling to concentrate the radioactive particulates; and means for removing the settled radioactive particulates from the reservoir after decanting as a concentrated radioactive contaminant waste.

12. The system as defined in claim 11, characterized by the sheet medium having flow openings between about 0.005 and 0.002 inch in size, and by the bed of granular filter medium being comprised of an upper layer of relatively coarse material superimposed on a lower layer of relatively fine material and an interface layer consisting of the relatively coarse and the relatively fine material between the upper and lower layers, both the coarse and fine materials having a specific gravity less than about 1.6.

13. The system as defined in claim 12, wherein the lower layer comprises anthracite having a specific gravity of about 1.6 and an average size of between about −12 and +30 mesh.

14. The system as defined in claim 13, wherein the upper layer consists essentially of granulated black walnut shells having a specific gravity of about 1.3 and an average size of between about −8 and +12 mesh.

15. The system as defined in claim 11, wherein the first filter further includes an inclined ramp adjacent a portion of the sheet filter, and a conveyor means having conveyor fights movable over the filtering surface of the sheet medium and along the inclinded ramp to remove accumulated contaminants from the sheet medium and the first filter.

16. The system as defined in claim 15, characterized by the sheet filter medium being interconnected with a conveyor means for indexing the sheet medium to a position for ejecting accumulated contaminants.

* * * * *